United States Patent [19]

Cashman

[11] Patent Number: 5,709,730
[45] Date of Patent: Jan. 20, 1998

[54] HYDROMETALLURGICAL PROCESSING OF FLUE DUST

[76] Inventor: Joseph B. Cashman, P.O. Box 122, Baring, Wash. 98224

[21] Appl. No.: 376,778

[22] Filed: Jan. 23, 1995

[51] Int. Cl.[6] ............................................. C21B 11/10
[52] U.S. Cl. ........................ 75/10.63; 75/724; 75/725; 75/726; 75/961; 204/106; 204/114; 423/554
[58] Field of Search ....................... 75/10.63, 725, 75/731, 724, 961, 319, 726; 204/106, 114; 423/554

[56] References Cited

U.S. PATENT DOCUMENTS

| | | |
|---|---|---|
| 60,514 | 12/1866 | Henderson . |
| 552,960 | 10/1896 | Hoepfner . |
| 1,175,587 | 3/1916 | Bickle . |
| 1,483,999 | 2/1924 | Welch . |
| 1,863,700 | 6/1932 | Sequine et al. . |
| 2,586,579 | 2/1952 | Supiro . |
| 3,816,306 | 6/1974 | Roy . |
| 3,849,121 | 11/1974 | Burrows . |
| 3,985,858 | 10/1976 | Cosgrove . |
| 4,292,281 | 9/1981 | Chilcote et al. . |
| 4,655,829 | 4/1987 | Cashman . |
| 5,078,786 | 1/1992 | Peters et al. ............... 75/961 |
| 5,089,242 | 2/1992 | Dijkhuis . |
| 5,336,297 | 8/1994 | McElroy ............... 75/961 |

FOREIGN PATENT DOCUMENTS

| | | |
|---|---|---|
| 481284 | 8/1929 | Germany . |
| 116296 | 3/1977 | Japan . |
| 66397 | 11/1977 | Japan . |
| 581 | of 1862 | United Kingdom . |
| 5607 | of 1882 | United Kingdom . |
| 5577 | of 1911 | United Kingdom . |

*Primary Examiner*—Melvyn Andrews
*Attorney, Agent, or Firm*—John C. Hammar

[57] ABSTRACT

Electric arc furnace production of recycled steel is plagued by the formation of an iron-depleted, metal-rich electric arc flue dust (EAFD). In the present invention, we recover at least about 85 wt. % of the base metals in the EAFD (i.e., lead, cadmium, copper, and zinc) as high quality metals products without producing any solid, liquid, of gaseous wastes. We use a recyclable calcium chloride/hydrochloric acid leach mill solution to extract the base metals form the EAFD in a reactor under a controlled pH of about 2.6 at an elevated temperature and pressure in an oxygen environment wherein the solids content in the reaction slurry is about 15-30 wt. %. In this way, we place the base metals in solution while leaving the iron as a solid hematite iron complex. When separated from the metal-rich solution, the solid hematite iron complex is recycled to the electric arc furnace. The base metals are precipitated and recovered. The calcium chloride/hydrochloric acid leach mill solution is regenerated through the addition of sulfuric acid to precipitate gypsum. Sodium, potassium, and magnesium in the EAFD remains insoluble or becomes insoluble in the reactor and is recycled in the solid hematite iron complex.

22 Claims, 1 Drawing Sheet

5,709,730

HYDROMETALLURGICAL PROCESSING OF FLUE DUST

TECHNICAL FIELD

The present invention relates to a hydrometallurgical process for treating electric arc flue dust (EAFD) to recover the valuable base metals from the flue dust while recycling the iron. More particularly, the present invention relates to a hydrometallurgical leach using a combination of calcium chloride and hydrochloric acid at controlled pH at a moderately elevated temperature and pressure to place the soluble base metals into solution with chloride for their subsequent precipitation and recovery.

BACKGROUND ART

Electric arc processing of recycled steel is the primary method used today in the United States to produce new steel. Electric arc processing replaces the conventional Bessemer furnace that arose at the glory days of the steel age at the turn of the Twentieth century and continued in use throughout this century. The electric arc process is more efficient in terms of energy and labor than the traditional mill processes. It produces, however, an electric arc flue dust (EAFD) waste product that is depleted in iron while remaining relatively rich in other commodity base metals, like zinc. This flue dust waste plagues the industry because it is unstable and is difficult to economically process to create a stable waste or to recover the base metals. Furthermore, EAFD is classified as a hazardous waste under U.S. EPA standards, so few facilities will store or process EAFD. The primary process used to treat EAFD is the Horsehead Industries pyrometallurgical process that is energy intensive in recovering the base metals. This pyrometallurgical process, however, itself produces flue dust which is even more difficult to stabilize because it is depleted of both iron and other base metals. Nevertheless, electric arc furnaces pay the pyrometallurgical processor today to process the EAFD so that the electric arc furnaces can continue to recycle iron and steel into new products. Obtaining such treatment for the EAFD requires transport of the dust from the electric arc furnace to the pyrometallurgical processor, which introduces yet another cost. The industry would benefit greatly from a process that would allow the electric arc furnace operator or another associated processor to treat and stabilize the EAFD at the electric arc furnace to recycle iron to the furnace while both recovering base metals for resale and eliminating unstable metal dusts or tailings.

The problem with untreated EAFD in the United States is substantial. Many tons of EAFD are presently stored at the existing furnace operations with EAFD being produced at a rate of about 500,000–750,000 tons/yr to more than one million tons per year by some estimates. The pyrometallurgical processor can only process about 250,00–300,000 tons/yr so the problem of EAFD continues to grow, adding about 250,000–500,000 ton/yr or more to the increasing stockpile. This remaining flue dust currently is either sent to Mexico (a processing opportunity today that may be curtailed by NAFTA environmental requirements) or is buried in hazardous waste landfills. Both of these alternatives are very expensive and do not resolve the environmental concerns. They both waste the metal value of the EAFD. Environmental concerns may soon curtail the use of the electric arc furnace in the U.S. unless an effective process is discovered for treating the EAFD. Slowdown or stoppage of the electric arc furnaces will create a problem with disposal of the iron and steel that presently is being recycled as well as a dramatic price increase for steel.

The existing pyrometallurgical process is not the long-term solution because of the problems associated with it. This pyrometallurgical process is energy intensive and itself creates a flue dust waste that is even more troublesome, albeit in smaller quantities, than the EAFD from which it starts. Economics and environmental concerns do not permit expansion of the pyrometallurgical process, and, in fact, they too threaten its existence. Therefore, the gap is growing with the profitability and vitality of the U.S. steel industry hanging in the balance.

Recovery of metals (both the base metals, like copper, lead, and zinc, and the precious metals, like gold and silver) from ores and concentrates, fly ash (including sewer sludge ash), contaminated soils, flue dust from base metal smelters and electric arc furnaces, and the like has been a significant commercial interest for many years. The precious metals are elements of wealth. The base metals are important in modern manufactured products. Existing processes have their merits and their drawbacks. Until the recent surge of environmentalism, recovery of precious and base metals drove the selection of the processes used. The important factor was simply obtaining these metals and the environmental costs were largely ignored. Society tolerated the resulting air, water, and soil pollution. Today, however, there is interest in developing a process that balances the needs of industry and the environment. There is need for a process that recovers the metals with high yield (generally at least about 85 wt. %) without producing hazardous wastes. We need a process that eliminates hazardous fluid waste streams, thereby greatly reducing water and air pollution that otherwise accompanies "smelting." The processes of the past have been tried and rejected, forgotten or discarded because they failed to satisfy all the important criteria. Emblematic of the change that has occurred in the metal processing industry is the shift to the electric arc furnace itself where metal hulks are recycled into new products at lower cost and with less pollution than can be achieved with recovering iron from ores.

The hydrometallurgical recovery process of the present invention offers a process that is efficient, economical, and environmentally-sensitive, producing an iron-rich feedstock for an electric arc furnace, recovering the valuable base metals in the EAFD, and producing calcium sulfate (gypsum) suitable for building materials. The process of the present invention does all this without creating significant air, water, or solid wastes while eliminating the problems of the prior art processes and achieving the goals of today.

SUMMARY OF THE INVENTION

The present invention is a hydrometallurgical process for treating EAFD to recover the base metals, especially lead and zinc, while recycling an iron-rich stream to the electric arc furnace and producing a salable calcium sulfate (gypsum) building material. The process uses a calcium chloride/hydrochloric acid leach to place the soluble base metals (i.e., copper, lead, cadmium, and zinc) into chloride solution generally without permitting a significant amount of the iron into solution. The chemistry of the process takes advantage of the relatively lower solubility of iron oxides ($Fe_2O_3$, $Fe_3O_4$) to that of the base metals in moderately acidic chloride solutions. The process also uses an oxidizing atmosphere to oxidize any soluble ferrous iron to ferric iron, which is essentially insoluble in aqueous solutions at a pH greater than 2.0. Thus, iron that does enter solution in the leach reactor oxidizes to the ferric form and precipitates out to be recovered with the iron-rich waste cake. The metal-rich solution that results from the leach is then treated using zinc dust to precipitate the copper, lead, and cadmium, followed by calcium hydroxide (hydrate of lime) to recover the zinc before the hydrochloric acid/calcium chloride leach mill solution is replenished or regenerated with sulfuric acid and recycled for reuse.

A slurry of the flue dust and the leach mill solution having a solids content (i.e., pulp density) of about 15–30 wt. % at a pH of about 2.6, at a moderately elevated temperature of about 90–120 deg C. at an elevated pressure of about 90 psi in an oxygen-rich atmosphere. While we can use higher pressures, they do not offer a significant advantage in improving the speed of the reaction or the yield of metals, so we avoid incurring the costs associated with operating at higher pressures. So, too, with the temperature. We prefer to use oxygen in our process to ensure that any soluble iron is converted to the ferric state and so that all other soluble metals are in their highest oxidation states.

We minimize the amount of soluble iron (having as little as 10 mg/l in the metal-rich solution) so that essentially all the iron will be recycled to the electric arc furnace with the waste cake and so that subsequent recovery and purification steps for the soluble base metals will not be complicated by the presence of iron.

In the process, then, we preferably mix dry EAFD powder with the leach mill solution in a ball mill to produce a slurry having the desired pH and solids content. We then oxidize the base metals, if necessary, in the slurry, other than the iron, to make them soluble. This leach occurs in the oxygen-rich atmosphere at a temperature of about 90–120 deg C (preferably 120 deg C) and a pressure of about 50–90 psi (preferably 90 psi) and, if the pH is controlled at about pH 2.6, leaves an insoluble hematite complex that can be separated and that can be recycled to the electric arc furnace for recovery of the iron. The zinc-containing complexes readily entering solution by this process are ZnO and ZnS, if present. "Zinc ferrite" species do not readily dissolve under the conditions of the present invention and, consequently, this zinc remains in the iron-rich waste cake. The metal-rich solution is treated to precipitate the metals of interest separately or together to permit their recovery. We prefer a zinc cementation precipitation of the copper, lead, and cadmium, concluding with the precipitation of zinc oxide by the addition of calcium oxide, calcium hydroxide, or a mixture thereof (preferably calcium hydroxide) leaving a calcium chloride solution having a pH in the range of about pH 6–10, and, generally around pH 6 unless an excess of calcium hydroxide is used during the zinc oxide precipitation. We treat this solution with sulfuric acid to create a solid gypsum byproduct and the leach mill solution which we recycle for further treatment of EAFD. Since we want the leach mill solution to have a pH of about 2.0–3.0, we want to minimize the pH of the calcium chloride solution while recovering substantially all of the zinc. Therefore, we prefer to add the minimum amount of calcium hydroxide necessary to promote the zinc oxide precipitation.

BRIEF DESCRIPTION OF THE DRAWING

The FIGURE shows a simplified flow diagram of the preferred process of the present invention.

BEST MODE FOR CARRYING OUT THE INVENTION

Figure 1:
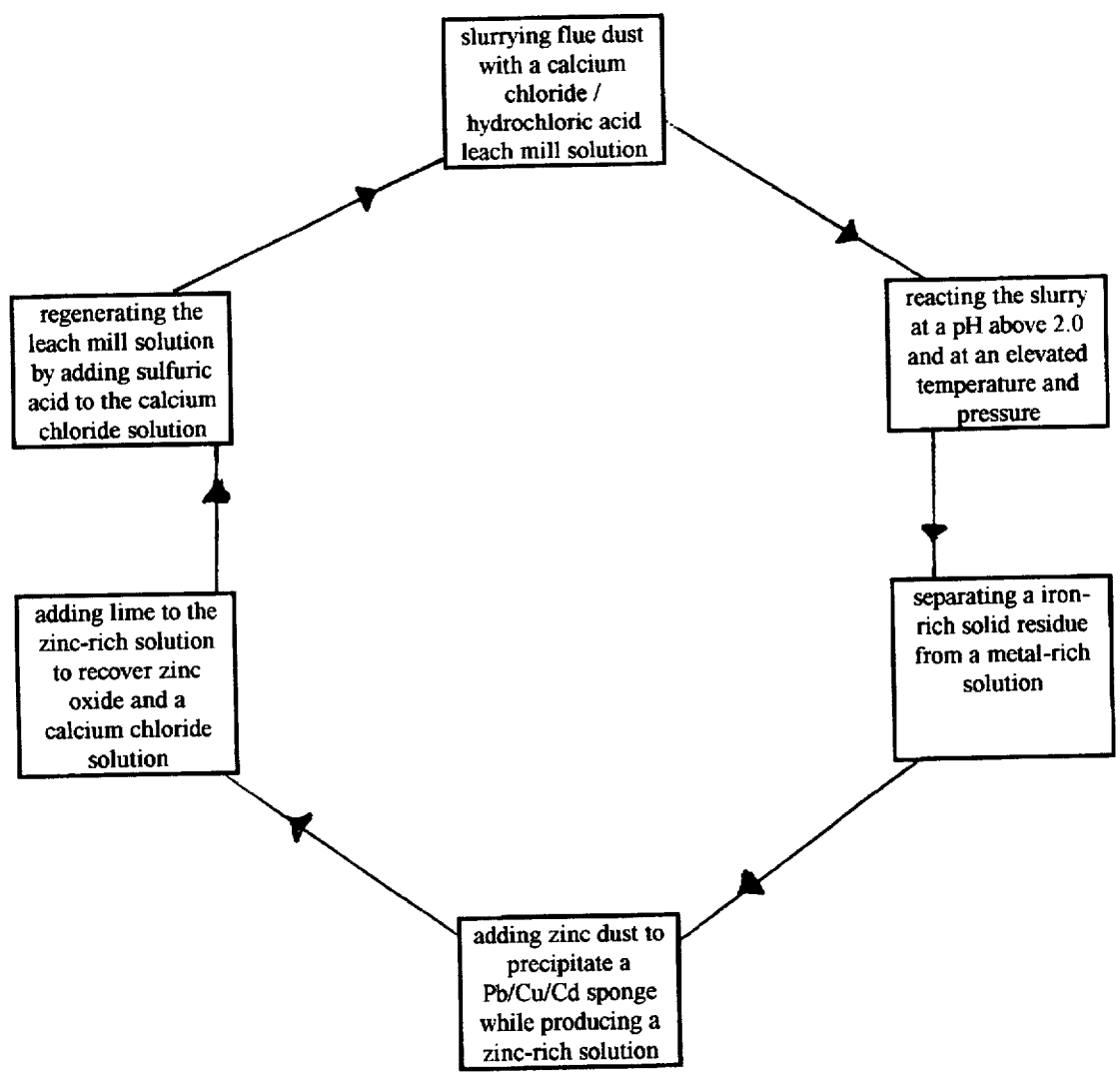

The present invention can be summarized as a simple, three-step process involving (1) oxidizing the EAFD in a leach mill solution to place the base metals in solution without placing a significant amount of the iron into solution, (2) precipitating the base metals from the solution, and (3) replenishing the leach mill solution. The leach mill solution is a calcium chloride and hydrochloric acid leach solution that has a negative water balance to eliminate any liquid waste streams in later processing steps.

The process uses a concentrated, aqueous solution of calcium chloride and hydrochloric acid where the concentration of calcium chloride is generally equal on a weight basis to the weight of EAFD to be treated. For example, one ton of EAFD can be mixed with one ton of calcium chloride and sufficient water to yield a slurry having a pH of about 2.6 and a solid content (pulp density) of about 15–30 wt. %. In the laboratory, however, a typical run would include about 200 gm calcium chloride, 200 gm EAFD and 650 gm water (i.e. 650 ml). The slurry is prepared in a ball mill by adding the EAFD slowly to the leach mill solution. The EAFD apparently is acid consuming, so the pH of the leach mill solution often must be less than 2.6 in the range of pH 1.5 to yield the proper leach mill solution. The paramount concern, however, is avoiding making the iron soluble, which it is prone to do at a pH below 2.6. Therefore, study with each specific EAFD to prepare the appropriate leach mill solution is probably required, as will be understood by those of ordinary skill in the art. We obtain the initial pH adding sulfuric acid to the calcium chloride solution and precipitating calcium sulfate (gypsum). Calcium chloride is generated in the process of the present invention, but minor losses over time dictate that from time to time calcium chloride be added to regenerate the leach mill solution. Nevertheless, the leach mill solution is quite stable and consistent from run to run. Sodium, potassium, and magnesium do not build up in the solution over low levels because the combination of calcium chloride and hydrochloric acid coupled with the elevated temperature and pressure of the reactor cause jarosites of pseudojarosites to form between the sodium, potassium, and magnesium with iron. Because the sodium, potassium, and magnesium are stable and controllable, the leach mill solution becomes recyclable which greatly simplifies the process and makes it economical. Without the stabilization of these minerals, a waste stream that would be difficult to process and difficult to dispose of would be generated and it would jeopardize the utility of the process.

The sulfuric acid addition step produces hydrochloric acid and a gypsum product that complexes water in the solid where it can be filtered from the leach mill solution to produce a negative water balance in the remainder of the reaction. Additional water is lost in the solid hematite product that results from the leach itself. The imbalance can be as much as 10–25% (typically 10% for the EAFD leach). If we control the wash water streams and steam sparges to keep the amount of water involved below these losses in the solid products, we can carry out the process, recycling the leach mill solution, without producing any liquid bleed streams for difficult treatment or disposal. This consequence, then, improves the utility of the process and helps to distinguish the present invention from earlier processes which generated large liquid waste streams. For example, if hydrochloric acid were used instead of sulfuric acid [it is much more expensive], then the process would produce a calcium chloride bleed stream and a wash water bleed stream, both of which would be troublesome to deal with. The chemistry of our process permits the separation of the base metals, such as copper, lead, cadmium, and zinc, from iron in the EAFD by keeping or converting any iron in the feed to its insoluble ferric state while leaving soluble the other base metals into the chloride solution.

For the EAFD process, the solid resulting from the addition of sulfuric acid is a salable gypsum that is filtered from the leach mill solution. The gypsum removes essentially all of the sulfur from the solution. Iron sulfides do not form in the reactor and sulfur is not introduced into the electric arc furnace when the iron byproduct is recycled. There are no sulfur emissions to the air.

While the mixer for the leach mill solution and the dry EAFD powder can be chosen from a variety of mechanical devices, I prefer to use a rubber lined ball mill with ceramic balls of uniform size having a diameter of approximately 2.5 in. While this description focuses on arc flue dust as the feed, the metal-rich reactant can be sewer sludge fly ash, soils contaminated with heavy metals, flue dust from base metal smelters, sulfide ores and concentrates, or other heavy metal products, as those skilled in the art will understand.

The slurry of the metal-rich feed and the leach mill solution are heated in a titanium- or glass-lined reactor in an oxygen or compressed air atmosphere to a temperature of about 90–120 deg C at a pressure of about 50–90 psi. The heating can occur using a steam sparge or with a steam jacket or with a combination of both, taking care to limit the introduction of water to the process.

While the reaction time varies with the materials being treated, the leach can oxidize the base metals and make them soluble in as short a time as 15 minutes. Sulfide ores usually take about one hour, although sulfur heavy ores can take as long as two hours. Sulfur heavy ores create an exothermic reaction which requires that the reactor be cooled. Flue dust, especially EAFD, requires the addition of heat. With flue dust, especially EAFD, there is no sulfur so that the oxidation is fast and little oxygen is consumed. When we use pure oxygen in the reactor, the only gaseous emissions occur with the loading and unloading of the charge to the reactor. If we use air, of course, there is a bleed stream of nitrogen, but this can be discharged without concern.

The reaction is complete when any soluble iron has been oxidized to hematite ($Fe_2O_3$). With the pH controlled above about 2.0, only a small amount of iron will enter the solution if any of the iron becomes soluble. Most of this iron that does enter solution will be oxidized to its insoluble ferric form and will return to the waste cake. Most of the other base metals, however (lead, cadmium, copper, and zinc) enter solution readily so that at least about 85–90 wt. % of each or more is recoverable. The remainder is carried over in the iron-rich hematite waste cake which is refed to the electric arc furnace for recovery of the iron and further concentration of the other valuable base metals. This hematite waste cake typically includes minor amounts of zinc and parts per million of lead and cadmium. It serves as a good feedstock for the electric arc furnace.

Using the combination of calcium chloride and hydrochloric acid places more lead in solution than is available by using either a calcium chloride leach or a hydrochloric acid leach alone. A calcium chloride leach will not dissolve metal oxide species, so we would miss the recovery of a significant part of the base metals in the EAFD. A hydrochloric acid leach (without calcium chloride) leaves a significant fraction of the lead in the iron-rich waste cake. A high lead waste cake is less desirable as a feedstock for electric arc furnaces. Table 2 shows the relative weights of zinc and lead in the waste cake for two types.

The iron-rich waste cake is recovered from the reactor slurry with a pressure belt filter which gives a good displacement cake wash, although we could use other separators.

The metal-rich solution is further treated to recover the base metals. Each metal can be precipitated individually or they can be recovered together. In EAFD processing, the small fractions individually of copper and lead, lead us to recover some metals together, especially lead, copper, and cadmium as metals in a sponge. For example, zinc (typically 100–200% of stoichiometric) can be added to preferentially precipitate the lead and cadmium. If copper is present in a significant enough concentration to justify independent recovery, we can precipitate it by adding calcium carbonate or can recover the copper with a solvent extraction. Generally, we simply precipitate it with the zinc cementation as a high quality metal sponge.

The metastasis process for recovering zinc oxide from the solution using calcium hydroxide (hydrate of lime) or calcium oxide or both is desirable because it regenerates a calcium chloride stream that can be recycled. In this way, the EAFD is converted into a source of iron and a source of base metals without the creation of any waste products.

In the process of the present invention, all the products are salable and there are no solid, liquid, or gaseous wastes that are hazardous or toxic. The maximum value from the EAFD is recovered. Earlier processes were incomplete in their recovery of the valuable metals and produced wastes that were unstable and difficult to handle. Thus, the present process maximizes the value of the metals while minimizing the environmental impact.

Turning, then, to the FIGURE, the process of the present invention begins with the mixing of the EAFD in a ball mill with a calcium chloride/hydrochloric acid leach mill solution to form a slurry. About equal weights of the EAFD and the calcium chloride are combined to make the final reacted slurry have a pH of about 2.6 and about 15–30 wt. % solids. If the pH is higher, the reaction is slow or is ineffective at placing the base metals in solution. If the pH is lower, although the base metals do enter solution, iron also enters solution. We try to avoid the addition of iron to the solution because its presence complicates the recovery steps that follow. Its presence in solution also diminishes the value of the waste cake as a feedstock for the electric arc furnace. We have found that at pH 2.6, most of the iron will not enter solution but instead will complex with the sodium, potassium, and magnesium, accomplishing a two-fold purpose. Only minor amounts of iron will be present in the solution. If the pH is lower, however, and iron does enter the solution, the process can still function. First, the presence of oxygen in the reactor and its circulation through the slurry during the leach causes ferrous iron to oxidize to its insoluble ferric state. We can remove essentially all the remaining soluble iron by adding calcium carbonate to a cooled metal-rich solution to precipitate an iron-rich solid. This iron product also can be recycled to the electric arc furnace. Of course, avoiding placing the iron in solution avoids the cost and time involved with the calcium carbonate addition step, so we prefer to control the pH. Also, controlling the pH reduces the overall expense of the process because it reduces the amount of acid and base that must be added at various process steps to adjust the pH. Thus, we try to keep the pH above 2.0 in the pH 2.6 range, but we can tolerate a lower initial pH, if the reaction is acid-consuming so long as, at the time of recovery of the metal-rich solution, the pH is above 2.0, the point at which ferric iron becomes soluble.

Second, the iron-sodium-potassium-magnesium complex removes the sodium, potassium, and magnesium from the solution and limits the concentration of these metals in later processing steps. We can recycle the leach mill solution without the need for a liquid bleed to regulate the concentration of sodium, potassium, and magnesium.

The EAFD is a dry powder that generally has the following characteristics:

Typical Grain Size

The EAFD is a fine powder finer than 100 ANSI mesh and generally finer than 200 mesh.

Typical Chemical Composition

20–25 wt. % Fe; 20–25 wt. % Zn; 2–3 wt. % Pb; and about 0.20–0.30 wt. % Cu

Lead is about ten times the concentration of copper and zinc is about ten times the concentration of lead. EAFD compositions vary, however, in wide ranges. In some, the zinc concentration can be as low as 5 wt. %. The actual composition depends greatly upon the feed to the furnace and to the product that the furnace produces.

The EAFD sometimes is supplied in pellet form, which increases the time in the ball mill, but has no other serious side effect.

The resulting slurry is charged to the titanium reactor which is usually about a 600–5000 gallon pressure vessel fitted with mechanical impellers for keeping the slurry mixed during the reaction, internal aeration (for introducing the oxygen, actually) and steam sparging lines, and external steam coils and cooling coils. The aeration and steam lines permit the introduction of steam, oxygen, or compressed air to the slurry to help to stimulate the reaction. Bubbling the steam or gas through the slurry ensures its mixing, and, at lower pulp densities, we can reduce the work required from mechanical impellers. The external coils allow heating or cooling of the reactor, as appropriate. Generally, heat is required to stimulate the reaction, which is endothermic, but heavy sulfide or sulfur ores produce an exothermic reaction where cooling is required. We maintain the reactor at a temperature of about 90–120 deg C and a pressure of about 50–90 psi. With the conditions, the reaction is fast and complete. Lower temperatures make the reaction so slow as to make the recovery uneconomical. Also, at temperatures below about 80 deg C, lead chloride has limited solubility so that it tends to precipitate from the solution and to contaminate the iron-rich waste cake. Higher temperatures do not appear to provide any significant improvements, and, since most reactions involve the addition of heat, especially for the recovery of the base metals from EAFD, heating the reaction to a higher temperature increases the processing cost. We prefer to process at about 120 deg C. If there is a significant concentration of sulfur in the EAFD (or in whatever ore we are processing), at the higher temperatures we recommend, the sulfur is oxidized to sulfate and precipitates, thereby limiting the concentration of sulfur in later recovery steps.

The pressure ensures that the water in the slurry does not boil. Using an overpressure allows us to use a higher temperature, but exerting the pressure, again, consumes energy, so we try to minimize this expense as well. We have found that 50–90 psi, and, preferably, 90 psi provides the best results.

The slurry is about 15–30 wt. % solids (i.e. pulp density), which makes it relatively fluid (although quite dense) and relatively easy to handle. Slurries of higher % solids would require a highly concentrated calcium chloride solution to maintain the weight ratio of EAFD to calcium chloride at approximately one. Processing become impractical because the slurry is so thick that mixing and oxidation are less efficient, thereby increasing the reaction time or reducing the yield from the near optimum conditions we have discovered and recommend. A % solids below 15 wt. % is processable, but the returns are diminished because of the dilution. The same amount of time and energy has been spent without the maximized recovery. Within the range, the competing factors are manageable. A concentrated slurry near the upper preferred limit of 30 wt. % offers the following advantages: high yields within a reasonable time with reasonable energy requirements to mix the slurry. Such a slurry, however, poses the following disadvantages: the high pulp density makes the slurry thick so that more energy is expended mixing the solution to ensure that the oxidation reaction proceeds to completion. A dilute slurry near the 15 wt. % lower bound offers the following processing advantages: better mixing with slightly faster overall reaction times and completeness of reaction, but suffers the following disadvantages: relatively smaller metal recoveries with respect to the volumes of liquids processed. Thus, one of ordinary skill in the art can see that within the range there is an envelope of acceptable performance that proves economical.

We prefer to process the EAFD with pure oxygen, but compressed air will also provide sufficient oxygen to complete the necessary oxidation in the reactor. With compressed air, however, there is a need for a gaseous nitrogen purge which can require special equipment.

We can heat the reactor with a steam sparge that introduces the heat through steam that is forced into the slurry. Sparging also adds water to the reactor. Therefore, we usually use the heating coils around the jacket or an oil convection heater extending within the tank to accomplish the necessary heating.

The EAFD reacts readily at low temperatures and pressures in most cases, but we have found that we can always achieve essentially complete reaction with the ranges of temperature and pressure we have described. We particularly prefer to conduct the reaction at 90 psi in oxygen at 120 deg C.

The reaction typically takes from 15 minutes to about 2 hours to reach completion. We measure completion by monitoring the presence of iron in solution and monitoring the pH. We look for the conversion of iron to $Fe_2O_3$, the ferric, insoluble state. When complete, we turn off the heating and the aeration or steam sparging and allow the solution to cool to a temperature of about 80 deg C before relieving the pressure on the reactor. As previously discussed, we keep the solution above about 80 deg C to retain the lead in solution.

We separate the iron-rich residue from the metal-rich solution, using a small water wash to clean the residue to increase the recovery of the base metals. With this wash and with any others in the process, we monitor the presence of metals to know that the wash is complete. The solution is still relatively hot during this processing stage, remaining at a temperature of about 80 deg C. We recycle the iron-rich residue (containing the sodium, potassium, and magnesium as well) to the electric arc furnace as a feedstock. In such recycling, the feedstock is usually combined with other, traditional sources of iron.

Following the filtering, we can allow the metal-rich solution to cool to ambient temperature, and, thereby, can recover lead chloride precipitates from the solution by filtering. If we detect iron in the solution (which never occurs if the pH is monitored properly in the reactor), we can proceed to an iron recovery stage. But, we generally prefer to proceed instead with a zinc cementation of the copper, lead, and cadmium to produce a zinc-rich chloride solution and a lead-copper-cadmium metal sponge. Because the sponge typically contains about ten times as much lead as copper, the sponge can be reprocessed to recover the lead values.

If we need to precipitate iron, we raise the pH to about 3.5–4.5 by adding calcium carbonate in powder form (to minimize the addition of water to the process). The precipitate is primarily a hematite, but it usually contains minor amounts of zinc oxide and lead oxide. Nevertheless, we can recycle this iron-rich residue to the electric arc furnace as a feedstock.

Before the zinc cementation, we assay the solution to determine the proper amount of zinc dust to add. A suitable zinc dust feedstock is produced within the process following the electrowinning of the zinc oxide precipitate formed in the metastasis process, so it is economical to recover the copper, cadmium, and lead. The cadmium and lead are valuable as pigments, even when contaminated with minor amounts of zinc. We add 100–200% Zn based on stoichiometry to a warm metal-rich solution (the filtrate) and stir the resulting solution for 15 minutes to produce a Cu/Pb/Cd sponge and a zinc-rich solution. We recover the sponge by filtration. The metal values in the sponge are recoverable by conventional methods as described at MATHEWSON, ZINC: THE SCIENCE AND TECHNOLOGY OF THE METAL AND ITS ALLOYS, Reinhold: N.Y., 1960, 551–554, 632–633, which we incorporate by reference.

The zinc-rich solution typically contains less than 5 mg/l Pb and less than 1 mg/l Cd and Cu.

The metastasis process for the recovery of zinc involves the reaction of calcium hydroxide or calcium oxide with the metal-rich solution, now mainly zinc, at a temperature of about 150 deg C for about 1 hour at a pH of about 6–10, and, preferably as low as possible to conserve acid in later steps. To minimize the amount of lime required to adjust the pH, we try to minimize the volume of the solution. Still, in processing large volumes of EAFD, the volumes are substantial. We add a stoichiometric amount of hydrated lime based upon an analysis of the zinc concentration in the solution, producing a solution with a pH between about 6–10. That is, we add the theoretically correct amount of lime to recover the zinc, and we have found that our process is high yield. The metastasis process produces a zinc oxide precipitate and calcium chloride in solution. Because the pH of this solution is about 10.5, to reuse the calcium chloride solution, we need to add acid. The addition of sulfuric acid is advantages for several reasons. First, the addition of concentrated sulfuric acid produces a gypsum (calcium sulfate) solid that can be recovered and sold. The gypsum naturally complexes water so that the resulting leach mill solution can be deficient in water based upon the theoretical amount needed in all the steps in the process. This negative water balance ensures that we do not have an liquid waste steams to treat or to dispose of. Second, the sulfuric acid generate hydrochloric acid in the solution so that the leach mill solution becomes a combined calcium chloride/ hydrochloric acid leaching solution. Our experiments show that this combined leach mill solution provides better yields of the base metals than using only calcium chloride or only hydrochloric acid, as we have earlier explained. Furthermore, the hydrochloric acid is generated at relatively low cost, since sulfuric acid is less expensive than hydrochloric acid.

Occasionally we prefer to filter the zinc-rich solution before adding the hydrate of lime. Although we do not understand the benefit of this filtering step in detail, we sometimes find that filtering gives us a higher yield of zinc in the metastasis step.

We use about 90% of the theoretical stoichiometric amount of calcium hydroxide to reduce the amount of calcium in the solid zinc product. The metastasis process at the elevated temperature and pressure at which we perform it produces both ZnO and $Zn(OH)_2$, so that the recovered solid has a Zn composition of about 55–65 wt. % with less than 10 wt. % Cl. If we were to complete the metastasis at ambient temperature and pressure, however, we would recover essentially only a $Zn(OH)_2$ product that would be severely contaminated with chloride (ca 30 wt. % Cl). The $ZnO/Zn(OH)_2$ product that we prepare is suitable for further purification or processing by conventional methods (such as those described in MATHEWSON or in MANTELL, ELECTROCHEMICAL ENGINEERING 4th Ed., McGraw Hill: N.Y., 1960, 198–247, which is incorporated by reference) while the severely contaminated product would be of little practical use, and, in fact, would be a disposal headache.

Table 1 illustrates the performance of the present invention in benchscale tests on two types of EAFD. In each case, an assay provides the composition of the EAFD feed, the iron-rich waste cake recovered from the reactor, and the fraction of soluble metals going to the metal-rich solution for subsequent processing and recovery. In these tests, the EAFD was slurried in a sufficient volume of $HCl/CaCl_2$ solution (approximately 1 liter) to give a pulp density of 20–25%. The amount of acid added depends on the EAFD composition, while the $CaCl_2$ is typically 100–200 gm/l. The acidified slurry was mixed vigorously at ambient temperature and atmospheric pressure for one hour, followed by 30 minutes agitation at elevated temperature in an oxygen atmosphere (90 psi). The majority of the zinc, lead, and cadmium species in the EAFD were converted to their highly soluble divalent chloride salts. Any divalent iron made soluble in the leach was oxidized to the insoluble iron (III), ferric oxide.

TABLE 1

|  | Feed | Waste cake | Filtrate (% recovery) |
|---|---|---|---|
| EAFD 1 |  |  |  |
| Cd | 0.055% | 70–100 ppm | 90–94% |
| Ca | 5.1% | 2.2–3.1% |  |
| Cl | 3.7% | 0.07–0.35% |  |
| Cr | 0.20% | 0.27–0.35% | 35–50% |
| Cu | 0.26% | 0.17–0.32% | 40–60% |
| Fe | 22.9 | 36–40% |  |
| Pb | 2.75% | 0.1–0.6% | 89–95% |
| Mn | 1.5% | 1.5–1.7% | ca.45% |
| Ni | 0.019% | 0.029–0.035% | ca.30% |
| Si | 2.1% | ca. 5% |  |
| Zn | 21.2% | 5.5–7.0% | 84–88% |
| EAFD 2 |  |  |  |
| Cd | 0.09% | 0.015–0.018% | 88–90% |
| Ca | 5.2% | ca.1.5% |  |
| Cl | 2.1% | NA |  |
| Cr | 0.175% | 0.25–0.30% | ca.15% |
| Cu | 0.195% | ca.0.2% | ca.45% |
| Fe | 22.9% | 44.8–48.5% |  |
| Pb | 2.75% | 0.25–0.41% | 92–95% |
| Mn | NA | NA | NA |
| Ni | 0.014% | NA | NA |
| Si | NA | NA | NA |
| Zn | 23.6% | 8.5–9.2% | 84–86% |

NA - not analyzed

Typically about 50–60 wt. % of the EAFD feed is recovered in the iron-rich waste cake and is recycled to the electric arc furnace.

The metal-rich solution typically contains 2–5 gm/l Pb, 35–40 gm/l Zn, 2–5 gm/l Cd, 100–200 mg/l Cu, and less than 10 mg/l iron, but the actual composition is dependent upon the concentration of these metal values in the EAFD feed.

TABLE 2

| Feed | Leach | % Pb in cake | % Zn in cake |
|---|---|---|---|
| EAFD 1 | HCl | 2.4% | 5.5% |
|  | HCl/CaCl$_2$ | 0.1–0.6% | 5.5–7.0% |
| EAFD 2 | HCl | 2.5% | 8.5–9.2% |
|  | HCl/CaCl$_2$ | 0.20–0.40% | ca. 19% |

Our tests show that the regenerated leach mill solution has no noticeable effect upon the oxidation/leach conditions, metal precipitation processes, iron-rich waste cake composition, or zinc oxide precipitate composition. Therefore, after startup of our process, the recovery of the base metals from the EAFD whittles down to a treatment, in effect, with sulfuric acid, which becomes the primary feedstock, other materials being recycled. This process, then, is very clean, efficient, and economical.

While we achieve recoveries of about 85–90 wt. % of the metal values, because the leach mill solution is recycled, the absolute yield in each precipitation step is not the critical factor. Instead, our interest is upon achieving a clean and readily usable solid product that is free from contamination from the other metal values. If the metals remain in solution, they will be available for recovery in subsequent passes, if the steps we have described are carried out correctly.

While we have described preferred embodiments of the process of the present invention and have provided examples of its operation, those skilled in the art will readily recognize variations, alterations, or modifications of the process that might be made to the invention with departing from the inventive concept. Accordingly, interpret the description and claims broadly to protect the inventive concept. The description of the preferred embodiments and the examples are given to illustrate the invention rather than to limit it. Only limit the invention as is required to distinguish the invention from the prior art.

I claim:

1. A hydrometallurgical process for the recovery of base metals including any of zinc, cadmium, and copper from electric arc flue dust containing, in addition to the base metals, any of iron, sodium, magnesium, and potassium capable of forming jarosites or pseudojarosites while producing only solid, stable byproducts suitable for sale or recycle, comprising the steps of:

(a) mixing dry electric arc flue dust powder with a calcium chloride/hydrochloric acid leach mill solution to produce a slurry having a pH of about 2.6 and a solids content (pulp density) of about 15–30 wt. %;

(b) oxidizing the base metals in the slurry to produce a metal-rich solution containing the base metals and to also produce an insoluble hematite complex by heating the slurry in an oxygen atmosphere at a temperature of about 90–120 deg C and a pressure of about 50–90 psi;

(c) filtering the hematite complex from the metal-rich solution;

(d) recovering base metal oxides including zinc oxide from the metal-rich solution while producing a calcium chloride recycle stream;

(e) adding sulfuric acid to the calcium chloride recycle stream to regenerate the calcium chloride/hydrochloric acid leach mill solution while producing gypsum;

(f) recycling the hematite complex to an electric arc furnace;

(g) recovering zinc metal from the base metal oxides;

(h) recycling the calcium chloride/hydrochloric acid leach mill solution.

2. The process of claim 1 wherein at least about 90 wt. % of the base metals enter the metal-rich solution while only parts per million iron enter such solution.

3. The process of claim 1 further comprising adding zinc to the metal-rich solution to precipitate lead, copper, and cadmium.

4. The process of claim 1 where the oxidizing step includes steam sparging of the slurry.

5. The process of claim 1 where the calcium chloride recycle stream initially has a pH of about 6–10.

6. The process of claim 1 wherein the weight of calcium chloride in the leach mill solution prior to the addition of sulfuric acid is substantially equal to the weight of flue dust added in the mixing step to form the slurry.

7. The process of claim 1 further comprising the step of removing the sodium, potassium, and magnesium with the hematite as jarosites or pseudojarosites so that the mill solution has a stable concentration of sodium, potassium, and magnesium permitting its recycle without a bleed stream to deplete the sodium, potassium, or magnesium.

8. The process of claim 1 further comprising the step of hydrating the gypsum to provide a negative water balance to avoid the need for a liquid bleed stream to remove excess water otherwise added to the process in other steps.

9. The process of claim 1 wherein the flue dust and the mill solution are mixed in a ball mixer.

10. The process of claim 1 further comprising the step of controlling the pH during the oxidizing step at about 2.6 to keep iron in the flue dust from entering solution so that the metal-rich solution contains at most a few parts per million iron.

11. The process of claim 1 yielding recovery of at least about 85 wt. % of each of the lead, cadmium, and zinc from the charge of flue dust.

12. The process of claim 1 further comprising the step of aerating the slurry during the oxidizing step.

13. The process of claim 12 wherein aerating includes forcing either oxygen or compressed air through the slurry.

14. The process of claim 1 further comprising the step of recovering iron from the hematite in the electric arc furnace.

15. The process of claim 10 further comprising the step of recovering copper oxide from the metal-rich solution by adding calcium carbonate to the solution to precipitate the copper.

16. The process of claim 15 further comprising the steps of recovering copper as copper metal from the copper oxide by electrowinning and recovering zinc as zinc metal from the zinc oxide by electrowinning.

17. A process for the treating of electric arc flue dust containing any of iron, sodium, potassium, and magnesium to recover base metals including any of copper, cadmium, and zinc in high yield without creating any hazardous or toxic gaseous, liquid, or solid wastes, comprising the steps of:

(a) reacting a slurry of the flue dust and a calcium chloride/hydrochloric acid leach mill solution to place the base metals in solution while leaving essentially all of the iron insoluble and complexed with the sodium, potassium, and magnesium;

(b) recovering the base metals from the solution to yield a calcium chloride solution; and (c) adding sulfuric acid to the calcium chloride solution to precipitate gypsum and to regenerate the calcium chloride/hydrochloric acid solution for recycling.

18. The process of claim 17 wherein the slurry reaction occurs at a solids content of about 15–30 wt. % at a pH of about 2.6 in a pressurized reactor under an oxygen-rich atmosphere and an elevated temperature.

19. The process of claim 17 further comprising the step of feeding the iron complex to an electric arc furnace to recover the iron.

20. The process of claim 17 wherein the recovery of the base metal includes precipitating the metals by adding calcium hydroxide to the solution so that the calcium chloride solution has a pH of about 6–10.

21. A process for the recovery of zinc from electric arc flue dust containing iron while recycling the flue dust iron to the electric arc furnace, comprising the steps of:

(a) at a pH of about 2.6, leaching zinc in the electric arc flue dust into an aqueous solution using a calcium chloride/hydrochloric acid leach mill solution;

(b) separating the aqueous solution from an insoluble iron-rich solid residue remaining after the leach of step (a);

(c) recovering the zinc from the aqueous solution by adding calcium hydroxide to the aqueous solution at a pH of about 6–10 to create a calcium-rich solution;

(d) regenerating the calcium chloride/hydrochloric acid leach mill solution by adding sulfuric acid to the calcium-rich solution to precipitate gypsum; and (e) separating the gypsum from the leach mill solution.

22. The process of claim 21 wherein the leach occurs in a pressure vessel at a temperature in the range of about 90–120 deg C and at a pressure in the range of about 50–90 psi and wherein the mill solution and flue dust are mixed to form a slurry having a solids content of about 15–30 wt. % flue dust.

* * * * *